US008867431B2

(12) United States Patent
Kim et al.

(10) Patent No.: US 8,867,431 B2
(45) Date of Patent: Oct. 21, 2014

(54) METHOD AND APPARATUS FOR MULTICELL COOPERATIVE COMMUNICATION

(75) Inventors: Hak Seong Kim, Anyang-si (KR); Dae Won Lee, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 13/257,587

(22) PCT Filed: Mar. 18, 2010

(86) PCT No.: PCT/KR2010/001673
§ 371 (c)(1),
(2), (4) Date: Sep. 19, 2011

(87) PCT Pub. No.: WO2010/107255
PCT Pub. Date: Sep. 23, 2010

(65) Prior Publication Data
US 2012/0147805 A1    Jun. 14, 2012

Related U.S. Application Data

(60) Provisional application No. 61/161,750, filed on Mar. 19, 2009, provisional application No. 61/176,490, filed on May 8, 2009.

(30) Foreign Application Priority Data

Mar. 18, 2010   (KR) .................. 10-2010-0024045

(51) Int. Cl.
*H04W 72/00*  (2009.01)
*H04Q 7/20*  (2006.01)
*H04B 7/155*  (2006.01)
*H04B 7/26*  (2006.01)
*H04W 72/04*  (2009.01)

(52) U.S. Cl.
CPC .............. *H04B 7/2606* (2013.01); *H04B 7/155* (2013.01); *H04W 72/0406* (2013.01)
USPC ........... 370/315; 370/328; 370/329; 370/348; 455/450; 455/17

(58) Field of Classification Search
CPC ............ H04W 72/0406; H04W 72/04; H04W 84/047; H04W 88/04; H04W 16/26; H04B 7/2606; H04B 7/15592; H04B 7/15528; H04B 7/15542; H04B 7/026; H04B 7/15507; H04B 7/715557; H04L 2001/0097
USPC ......... 370/310, 315, 316, 322, 328, 338, 349, 370/329, 348; 455/13.1, 7, 16, 22, 450, 17
See application file for complete search history.

(56) References Cited

U.S. PATENT DOCUMENTS 7,742,739 B2 *   6/2010   Diaz Cervera et al. ...... 455/11.1
8,305,965 B2 *  11/2012   Shen et al. .................... 370/328

(Continued)

FOREIGN PATENT DOCUMENTS

KR    1020070034408    3/2007

OTHER PUBLICATIONS

Fujitsu, "Discussion on DL coordinated multipoint transmission," R1-083115, 3GPP TSG-RAN1 #54, Aug. 2008.

(Continued)

*Primary Examiner* — Wutchung Chu
(74) *Attorney, Agent, or Firm* — Lee, Hong, Degerman, Kang & Waimey (57) ABSTRACT

According to one aspect of the present invention, a method in which a relay performs multicell cooperative communication comprises the steps of: receiving scheduling information and data from a base station; receiving a bypass indicator from the base station; performing protocol layer processing on the scheduling information and data in accordance with the bypass indicator; and transmitting the processed data to a user equipment in accordance with the processed scheduling information, wherein said bypass indicator indicates that the protocol layer processing should be performed for only a portion of the protocol layer of the relay.

6 Claims, 12 Drawing Sheets

(56) References Cited

U.S. PATENT DOCUMENTS

| | | |
|---|---|---|
| 8,331,291 B2 * | 12/2012 | Halfmann et al. ............ 370/328 |
| 8,340,029 B2 * | 12/2012 | Chion et al. ................. 370/329 |
| 2007/0072604 A1 * | 3/2007 | Wang .......................... 455/428 |
| 2008/0151809 A1 * | 6/2008 | Chindapol et al. ........... 370/315 |
| 2008/0175183 A1 * | 7/2008 | Devroye et al. .............. 370/315 |
| 2008/0186950 A1 * | 8/2008 | Zhu et al. ..................... 370/350 |
| 2008/0240054 A1 * | 10/2008 | Sandhu et al. ................ 370/338 |
| 2008/0247350 A1 * | 10/2008 | Tsai et al. ..................... 370/315 |
| 2008/0285501 A1 * | 11/2008 | Zhang et al. .................. 370/315 |
| 2009/0073916 A1 * | 3/2009 | Zhang et al. .................. 370/315 |
| 2009/0116490 A1 * | 5/2009 | Charpentier et al. ...... 370/395.1 |
| 2009/0141668 A1 * | 6/2009 | Zhang et al. .................. 370/315 |
| 2009/0175214 A1 * | 7/2009 | Sfar et al. ..................... 370/315 |
| 2010/0110964 A1 * | 5/2010 | Love et al. .................... 370/312 |
| 2010/0150022 A1 * | 6/2010 | Cai et al. ...................... 370/254 |
| 2010/0272007 A1 * | 10/2010 | Shen et al. .................... 370/315 |
| 2011/0212684 A1 * | 9/2011 | Nam et al. ........................ 455/7 |
| 2012/0002741 A1 * | 1/2012 | Wang et al. ................... 375/260 |

OTHER PUBLICATIONS

LG Electronics Inc., "Further clarification on L3 relay node for LTE-A," R1-090662, TSG-RAN WG1 Meeting #56, Feb. 2009.

* cited by examiner

FIG. 12

METHOD AND APPARATUS FOR MULTICELL COOPERATIVE COMMUNICATION

CROSS-REFERENCE TO RELATED APPLICATIONS

This application is a 371 U.S. national stage application of International Application No. PCT/KR2010/001673, filed on Mar. 18, 2010, which claims priority to Korean Application No. 10-2010-0024045, filed on Mar. 18, 2010, and U.S. Provisional Application Ser. Nos. 61/176,490, filed on May 8, 2009 and 61/161,750, filed on Mar. 19, 2009, the contents of which are incorporated by reference herein in their entirety.

TECHNICAL FIELD

The present invention relates to wireless communication and, more particularly, to a method and apparatus for performing Cooperative Multiple Points Transmission and Receptions (CoMP).

BACKGROUND ART

In ITU-R (International Telecommunication Union Radio communication sector), a standardization task for IMT (International Mobile Telecommunication)-Advanced (i.e., the next-generation mobile communication system after the $3^{rd}$ generation) is being in progress. IMT-Advanced sets its goal to support IP (Internet Protocol)-based multimedia service at the data transfer rate of 1 Gbps in the stop and slow-speed moving states and at the data transfer rate of 100 Mbps in the fast-speed moving state.

3GPP ($3^{rd}$ Generation Partnership Project) is preparing for a system standard to satisfy the requirements of IMT-Advanced. That is LTE-Advanced improved from LTE (Long Term Evolution) based on OFDMA (Orthogonal Frequency Division Multiple Access)/SC-FDMA (Single Carrier-Frequency Division Multiple Access) transmission schemes. LTE-Advanced is one of the strong candidates for IMT-Advanced. Relay station technology is included in the major technology of LTE-Advanced. Relay station is a device which relays a signal between a base station and a user equipment. It is used for extending a cell coverage and improving a throughput of the wireless communication system.

Relay stations may be classified into several types according to their functions. For example, the relay stations may be classified into an L1 relay station (type 3 relay station), an L2 relay station (type 2 relay station), and an L3 relay station (type 1 relay station). The L1 relay station is a relay station having some additional functions along with AF (Amplify and Forward; forwarding after amplification). The L1 relay station amplifies a signal received from a base station or a user equipment and then transfers the amplified signal to the user equipment or the base station. The L2 relay station is a relay station having a scheduling function along with DF (Decoding and Forward; forwarding after decoding). The L2 relay station recovers information through processes, such as demodulation and decoding, for a signal received from a base station or a user equipment, generates a signal through processes, such as coding and modulation, and transfers the generated signal to the user equipment or the base station. The L3 relay station is a relay station having a similar shape as one cell. The L3 relay station supports call access, release, and mobility functions along with the functions of the L2 relay station. The L1, L2, and L3 relay stations perform different functions and uses different protocols when sending signals.

Furthermore, in the recent wireless communication system field, in a wireless communication system having a multi-cell structure, research is being carried out on schemes for improving the performance of a user equipment placed at the edge of a cell. In the wireless communication system having the multi-cell structure, active research is being carried out on coordinated multipoint transmission and receptions (CoMP) technology in which signals are transmitted through inter-cell mutual cooperation. According to CoMP, a user equipment, particularly, a user equipment placed at the edge of a cell can have improved signal sensitivity as well as an improved transmission power gain by communicating with a number of base stations.

If an entity participating in CoMP as a cooperative cell is the L3 relay station, the L3 relay station receives control information and data transmitted by a base station, performs decoding according to a protocol architecture, encodes the control information and data according to its own protocol architecture, and sends them to a user equipment. In this case, scheduling information and the like which are related to a transport block transmitted by the base station may be changed by the L3 relay station because of a difference in the channel state, the scheduling strategy and so on between the base station and the L3 relay station. Accordingly, the user equipment may have difficulties in the reception, decoding and so on of a signal according to CoMP owing to a difference between the signal received from the base station and the signal received from the L3 relay station.

Furthermore, if CoMP is performed in a wireless communication system including different and heterogeneous relay stations, different protocols may be used in the relay stations. Accordingly, a user equipment which receives signals from the heterogeneous relay stations and a base station according to CoMP may have a difficulty in performing decoding.

DISCLOSURE

Technical Problem

There are provided a method and apparatus which can perform CoMP in a wireless communication system including a relay station.

Technical Solution

A method of a relay station performing CoMP according to an aspect of the present invention includes the steps of receiving scheduling information and data from a base station; receiving a bypass indicator from the base station; performing protocol layer processing for the scheduling information and the data according to the bypass indicator; and sending the processed data to a user equipment based on the processed scheduling information, wherein the bypass indicator is information instructing that the protocol layer processing be performed for only some of protocol layers included in the relay.

A method of a relay station performing CoMP according to another aspect of the present invention includes the steps of receiving scheduling information and data from a base station; receiving a protocol control indicator from the base station; performing protocol layer processing for the scheduling information and the data according to the protocol control indicator; and sending the processed data to a user equipment based on the processed scheduling information, wherein the protocol control indicator is information instructing that an MAC layer value received from the base station remain intact in the protocol layer processing for the scheduling information and the data.

Advantageous Effects

CoMP can be performed in a wireless communication system including a relay station. The forward compatibility of a wireless communication system can be improved because CoMP can be performed although different and heterogeneous relay stations are included in a wireless communication system.

MODE FOR INVENTION

Hereinafter, in order to clarify a description, 3GPP LTE/LTE-A are chiefly described, but the technical feature of the present invention is not limited thereto. The present invention may also be applied to other wireless communication systems, for example, other systems, such as IEEE 802. 16 m.

Figure 1:
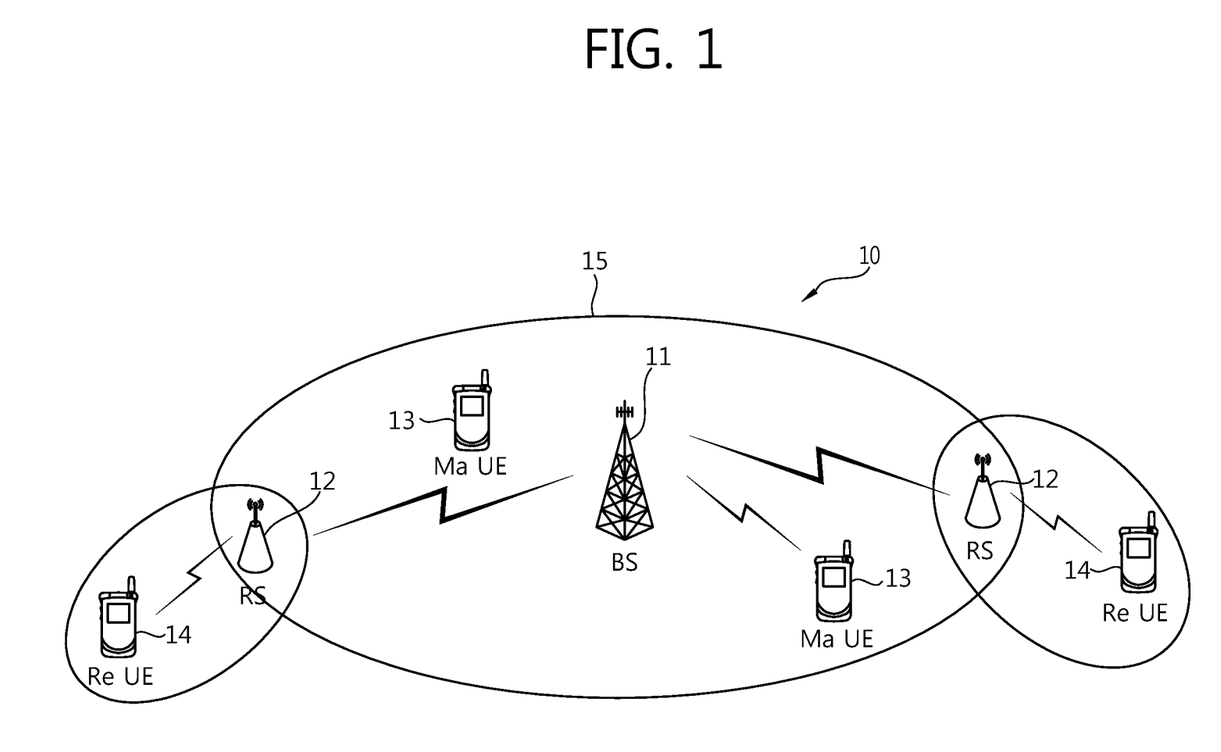
FIG. 1 shows a wireless communication system including a relay station.

FIG. 1 shows a wireless communication system including a relay station.

Referring to FIG. 1, the wireless communication system 10 including a relay station includes at least one Base Station (BS) 11. The BS 11 provides communication service to a specific geographical area 15 commonly called a cell. The cell may be classified into a plurality of areas. Each of the areas is called a sector. The one or more cells may exist in one BS. In general, the BS refers to a fixed station communicating with a User Equipment (UE) 13. The BS 11 may also be called another terminology, such as an eNB (evolved NodeB), a BTS (Base Transceiver System), an access point, or an AN (Access Network). The BS 11 may perform functions, such as connectivity between UEs 14, management, control, and resource allocation.

A Relay Station (RS) 12 refers to equipment for relaying a signal between the BS 11 and the UE 14, and it may also be called another terminology, such as a Relay Node (RN), a repeater, or a relay.

The UE 13 or 14 may be fixed or mobile and may also be called another terminology, such as an MS (Mobile Station), an UT (User Terminal), an SS (Subscriber Station), a wireless device, a PDA (Personal Digital Assistant), a wireless modem, a handheld device, or an AT (Access Terminal). Hereinafter, a Macro UE (Ma UE) 13 refers to a UE directly communicating with the BS 11, and a relay UE (Re UE) 14 refers to a UE communicating with an RS 12. The Ma UE 13 may also communicate with the BS 11 via the RS 12 in order to improve the transfer rate according to a diversity effect, although the Ma UE 13 is placed within the cell of the BS 11.

Hereinafter, downlink (DL) refers to communication from the BS 11 to the Ma UE 13, and uplink (UL) refers to communication from the Ma UE 13 to the BS 11. A backhaul link means a link between the BS 11 and the RS 12. Backhaul downlink refers to communication from the BS 11 to the RS 12, and backhaul uplink refers to communication from the RS 12 to the BS 11. An access link means a link between the RS 12 and the Re UE 14. Access downlink refers to communication from the RS 12 to the Re UE 14. Access uplink refers to communication from the Re UE 14 to the RS 12.

Figure 2:
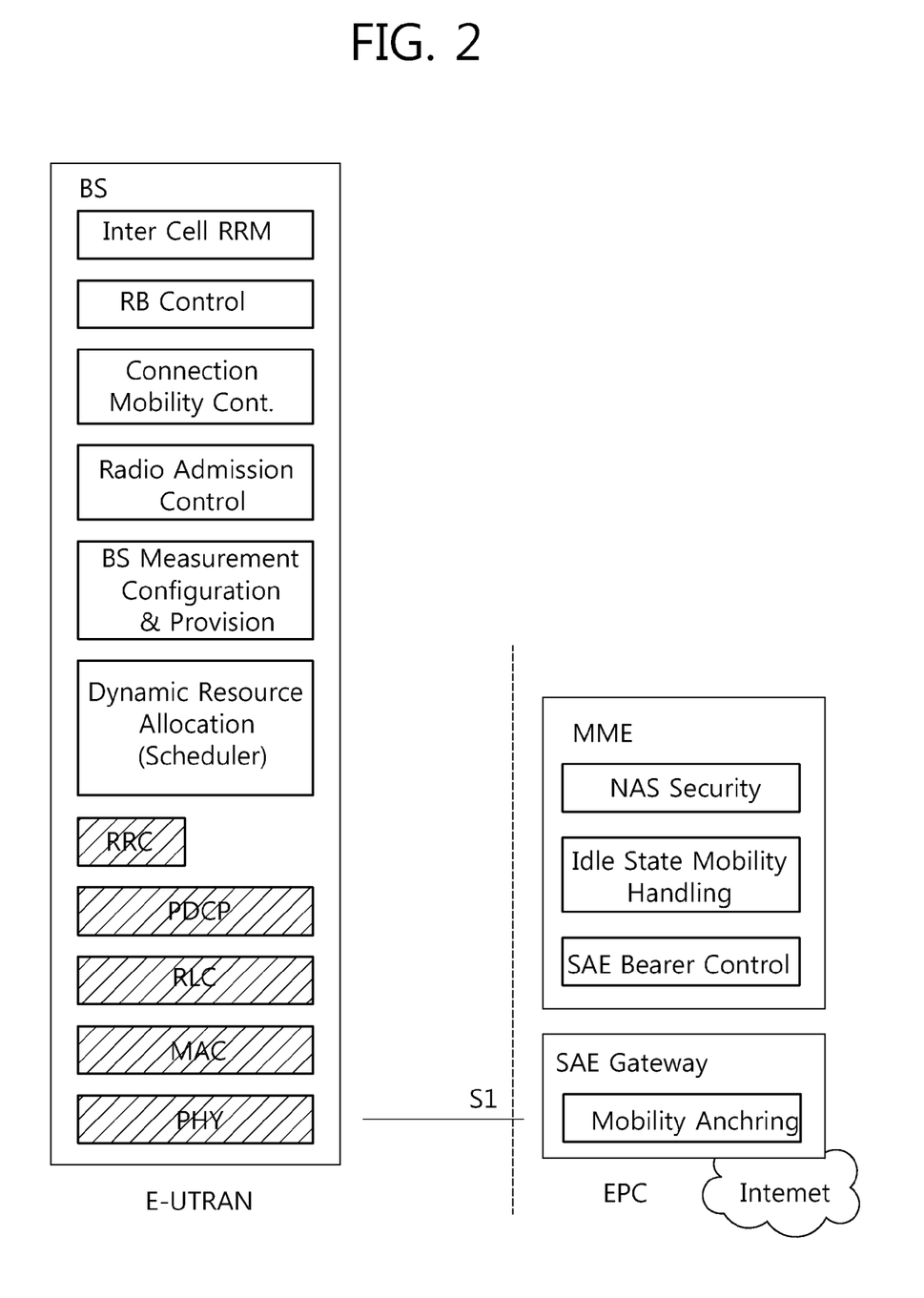
FIG. 2 is a block diagram showing a functional split between an E-UTRAN (Evolved UMTS Terrestrial Radio Access Network) and an EPC (Evolved Packet Core).

FIG. 2 is a block diagram showing a functional split between an E-UTRAN (Evolved UMTS Terrestrial Radio Access Network) and an EPC (Evolved Packet Core). In FIG. 2, slant boxes indicate radio protocol layers, and white boxes indicate the functional entities of a control plane.

Referring to FIG. 2, a BS performs the following functions. (1) A Radio Resource Management (RRM) function, such as radio bearer control, radio admission control, connection mobility control, and dynamic resource allocation to a UE, (2) The compression of an Internet Protocol (IP) header and the decryption of user data streams, (3) The routing of user plane data to an S-GW (serving gateway), (4) The scheduling and transmission of a paging message, (5) The scheduling and transmission of broadcast information, and (6) Measurement for mobility and scheduling and the setting of a measurement report.

An MME performs the following functions. (1) Non-Access Stratum (NAS) signaling, (2) NAS signaling security, (3) Idle mode UE reachability, (4) Tracking area list management, (5) Roaming, and (6) Authentication.

An S-GW performs the following functions. (1) Mobility anchoring and (2) Lawful interception.

A P-GW (PDN-Gateway) performs the following functions. (1) UE IP allocation and (2) Packet filtering.

The layers of a radio interface protocol between a UE and a network may be classified into a first layer L1, a second layer L2, and a third layer L3 on the basis of the three lower layers of an Open System Interconnection (OSI) model which is widely known in communication systems. The first layer is a physical (PHY) layer. The second layer may be classified into an MAC (Medium Access Control) layer, an RLC (Radio Link Control) layer, and a PDCP (Packet Data Convergence Protocol) layer. The third layer is an RRC (Radio Resource Control) layer. The PHY layer provides information transfer service using physical channels. A Radio Resource Control (hereinafter referred to as 'RRC') layer placed in the third layer functions to control radio resources between a UE and a network. To this end, in the RRC layer, RRC messages are exchanged between the UE and the network.

Figure 3:
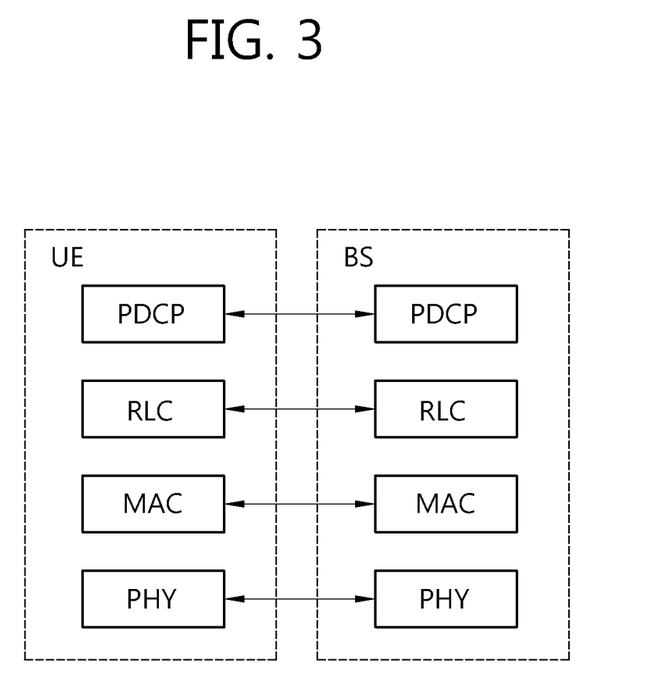
FIG. 3 is a block diagram showing a radio protocol architecture for a user plane.
Figure 4:
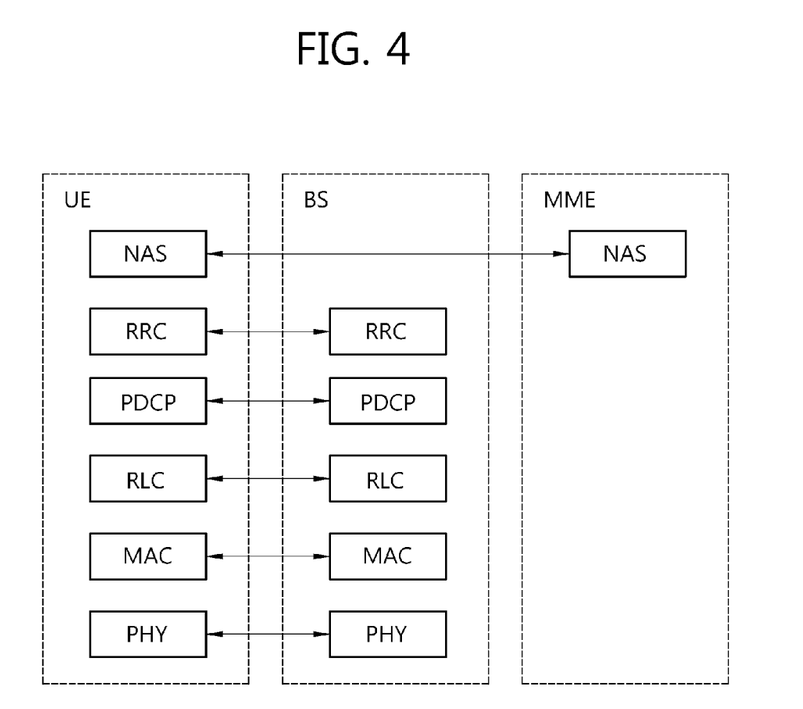
FIG. 4 is a block diagram showing a radio protocol architecture for a control plane.

FIG. 3 is a block diagram showing a radio protocol architecture for a user plane. FIG. 4 is a block diagram showing a radio protocol architecture for a control plane. FIGS. 3 and 4 show the architectures of radio interface protocols between a UE and an E-UTRAN. The user plane is a protocol stack for user data transmission, and the control plane is a protocol stack for control signal transmission. In general, the protocol stack means a number of layers for processing data.

Referring to FIGS. 3 and 4, data is moved through physical channels between different physical layers (i.e., the physical layers on the sending side and the receiving side). The physical layers are interconnected through an MAC layer and a transport channel on the upper side. Data is moved between the MAC layer and the physical layer through the transport channel. The physical layer provides information transfer service to the MAC layer and higher layers using the transport channel.

The MAC layer provides service to an RLC layer (i.e., a higher layer) through a logical channel. The RLC layer supports reliable data transmission and may perform segmentation and concatenation functions for an RLC Service Data Unit (hereinafter referred to as an 'SDU') downloaded from a higher layer. A PDCP layer performs a header compression function for reducing an IP packet header size.

The RRC layer is defined only in the control plane. The RRC layer functions to control radio resources between a UE and a network. To this end, in the RRC layer, RRC messages are exchanged between the UE and the network. The RRC layer is related to the configuration, re-configuration, and release of radio bearers and is responsible for controlling the logical channels, the transport channels, and the physical channels. The radio bearer means service which is provided by the second layer in order to transfer data between a UE and an E-UTRAN. If RRC connection exists between the RRC of a UE and the RRC of a network, the UE is in the RRC connected mode. If RRC connection does not exist between the RRC of the UE and the RRC of the network, the UE is in the RRC idle mode.

An NAS (Non-Access Stratum) layer placed over the RRC layer performs functions, such as session management and mobility management.

Figure 5:
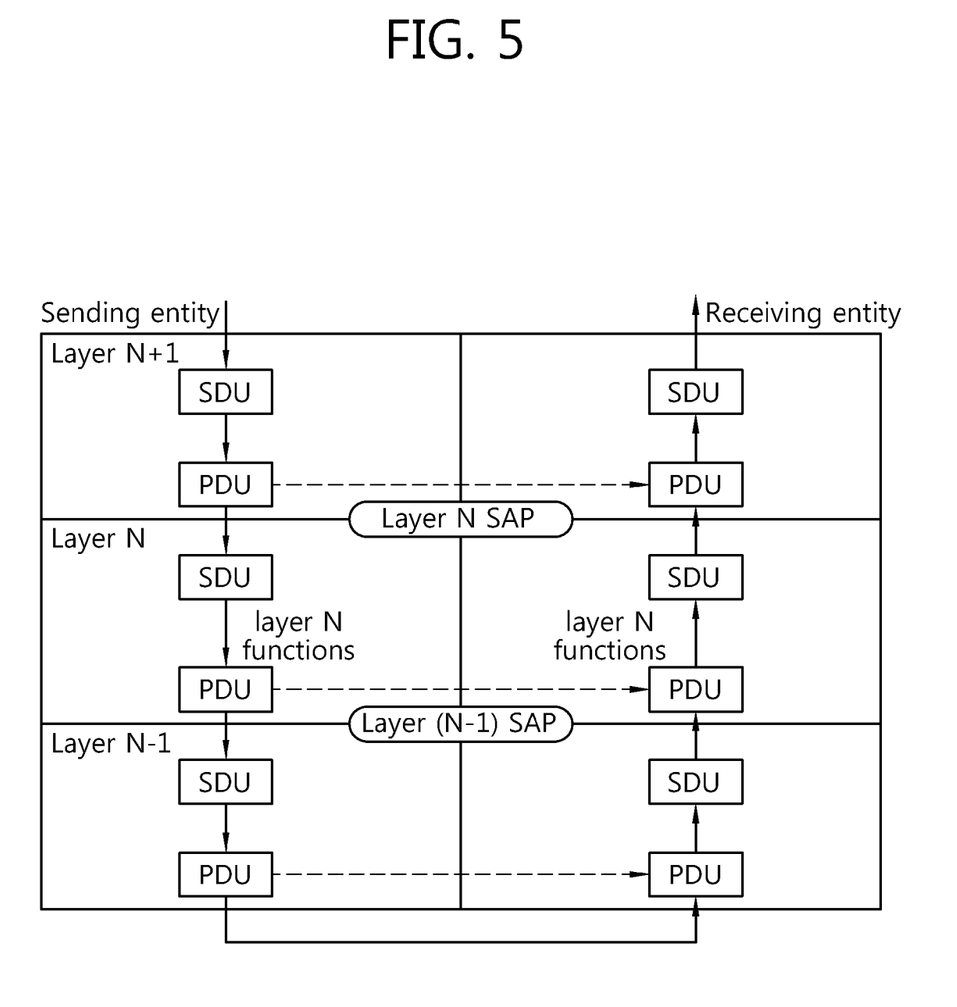
FIG. 5 is a block diagram showing a relationship between a Service Data Unit (SDU) and a Protocol Data Unit (PDU) in the protocol stack of sending/receiving entities.

FIG. 5 is a block diagram showing a relationship between an SDU and a PDU in the protocol stack of sending/receiving entities.

In the sending entity, data is transmitted from a higher layer to a lower layer. In general, the lowest layer of the sending and receiving entities is the PHY layer, and data is transmitted to the receiving entity through the PHY layer. Data received in the receiving entity is transmitted from a lower layer to a higher layer. Each of the layers is connected to an SAP (Service Access Point) which makes the services of a lower layer useful in a neighboring higher layer.

In the sending entity, a data unit forwarded from a neighboring higher layer to a relevant layer is called the SDU (Service Data Unit). A data unit processed according to the functions of the relevant layer and forwarded to the neighboring lower layer is called the PDU (Protocol Data Unit). In the receiving entity, a data unit forwarded from a neighboring lower layer to a relevant layer is called the PDU. A data unit processed according to the functions of the relevant layer and forwarded to the neighboring higher layer is called the SDU. For example, when a BS generates an MAC PDU, the MAC PDU is generated by adding an MAC header to an MAC SDU. A CRC (cyclic redundancy check) may be selectively added to the MAC PDU. The MAC SDU is a data unit forwarded from a higher layer (e.g., the RLC layer) to the MAC layer. The MAC PDU is a data unit forwarded from the MAC layer to a lower layer (e.g., the PHY layer).

The sending entity may be a BS in the downlink and the backhaul downlink and may be an RS in the access downlink.

The receiving entity may be a UE in the downlink and the access downlink and may be an RS in the backhaul downlink.

Figure 6:
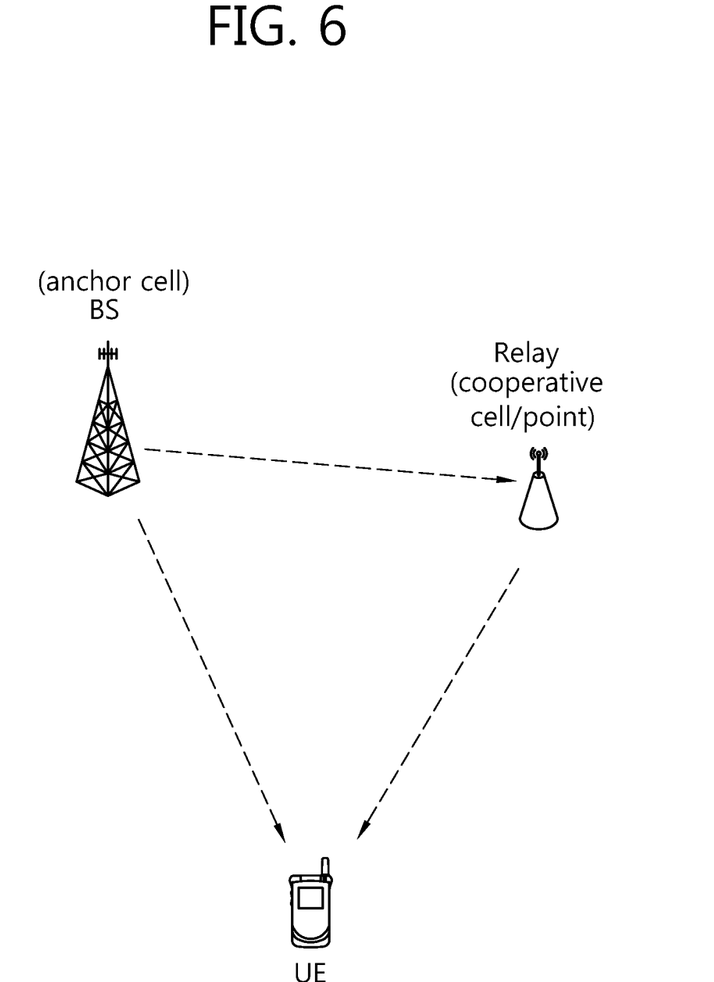
FIG. 6 shows a wireless communication system performing CoMP according to an embodiment of the present invention.

FIG. 6 shows a wireless communication system performing CoMP according to an embodiment of the present invention.

Here, the CoMP (Cooperative Multiple Points Transmission and Receptions) means a communication method in which a plurality of cells cooperates with each other and sends signals to a destination station, such as a UE. The CoMP may be divided into a CS (Coordinated Scheduling) method and a JP (Joint Processing) method. In regard to a specific time, the CS method is a method in which only one of a plurality of cells participating in CoMP performs transmission. The JP method a method in which some of a plurality of cells participating in CoMP performs transmission.

Referring to FIG. 6, a BS sends a signal to a UE through downlink. Furthermore, an RS receives a signal from the BS through backhaul downlink and sends the signal to the UE through access downlink. The UE receives the signals from the BS and the RS. In case of the JP method, the BS and the RS may send signals to the UE at the same time by performing CoMP.

RSs participating in CoMP may be classified into several types as in Table 1 below according to their functions.

TABLE 1

| function | L1 Relay (Type-3 relay) | L2 Relay (Type-2 relay) | L3 Relay (Type-1 relay) |
| --- | --- | --- | --- |
| RF function | X | X | X |
| Coder/Decoder and CRC | — | X | X |
| HARQ | — | X | X |
| Multiplex & Demultiplex of MAC SDU | — | X | X |
| Priority(Qos) handling | — | X | X |
| Scheduling | — | X | X |
| Outer ARQ | — | (X) | X |
| (Re)-Segmentation and concatenation | — | (X) | X |
| Header compression (ROHC) | — | — | — |
| Reordering of lower layer SDUs | — | — | — |
| In-sequence delivery of upper layer PDUs | — | — | — |
| Duplicate detection of lower layer SDUs | — | — | — |
| Ciphering | — | — | — |
| System information broadcast | — | — | X |
| RRC Connection set-up and maintenance | — | — | X |
| Radio Bearers set-up and maintenance | — | — | — |
| Mobility function | — | — | X |
| MBMS services control | — | — | — |
| Paging | — | — | — |
| QoS management | — | — | (X) |
| UE measurement reporting and control the reporting | — | — | (X) |
| NAS signaling handling | — | — | — |

In Table 1, 'X' means that a relevant function is supported, '(X)' means that a relevant function may be supported, and '-' means that a relevant function is not supported. Hereinafter, the L1 relay is a relay having some additional functions along with AF (Amplify and Forward; forwarding after amplification). The L1 relay amplifies signals received from a BS or a UE and forwards the signals to the UE or the BS. That is, the L1 relay refers to a relay which cannot perform an independent scheduling function, and it may be considered as a simple repeater. The L2 relay is a relay having a scheduling function along with DF (Decoding and Forward; forwarding after decoding). The L2 relay recovers information from signals, received from a BS or a UE, through processes, such as demodulation and decoding, generates signals through processes, such as coding and modulation, and sends the signals to the UE or the BS. The L3 relay is a relay having a similar form as one cell. The L3 relay can support call access, release, and mobility functions along with the functions of the L2 relay. In Table 1, the relays are classified into the L1 relay, the L2 relay, and the L3 relay, which are illustrative. This classification is based on the schematic characteristics of the L1, L2, and L3 relays, but is not necessarily compatible with the terms. The L1, L2, and L3 relays may be different in their protocol layer structures.

Figure 7:
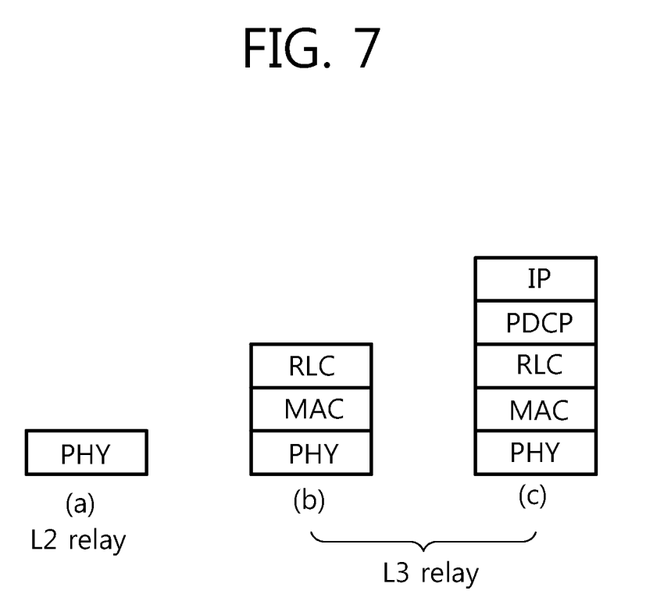
FIG. 7 shows protocol layer structures according to the types of relay stations.

FIG. 7 shows protocol layer structures according to the types of relay stations.

Referring to FIG. 7(a), the L2 relay may require only the protocol of the PHY layer for MAC PDU forwarding. Referring to FIG. 7(b) and FIG. 7(c), the L3 relay may require the protocols of the PHY layer and the MAC layer for RLC PDU forwarding and may require the protocols of the PHY layer, the MAC layer, and the RLC layer for PDCP PDU forwarding. Furthermore, the L3 relay may require the protocols of the PHY layer, the MAC layer, the RLC layer, the PDCP layer, and the IP layer for IP packet (i.e., the PDCP-SDU) delivery. Hereafter, the L3 relay is illustrated to have a protocol layer structure, such as that shown in FIG. 7(c), but not limited thereto. For example, the L3 relay may have a protocol layer structure, such as that shown in FIG. 7(b). The L3 relay may receive the signal of the PHY layer from a BS, decode the data according to relevant protocols in order of the MAC layer, the RLC layer, the PDCP layer, and the IP layer, encode the decoded data according to the protocols in reverse order, and send the encoded data to a UE. In the internal processing process of the L3 relay (i.e., the process of removing a header, performing decoding, adding a header again, and performing encoding according to the protocol of each layer), a transport block received from the BS and scheduling information related to the transport block may be changed. For example, the size, contents, etc. of the MAC PDU may be changed. This is because a channel state, a scheduling strategy and so on between a relay and a UE may differ from a channel state, scheduling strategy and the like between a BS and the UE. For example, segmentation performed in the RLC layer of a relay may change the size of an RLC PDU according to a channel state of an access link. This change may make the size, contents, MCS, etc. of an MAC PDU of the relay different from those of an MAC PDU transmitted by a BS. In this case, a UE receives the MAC PDU from the BS and the MAC PDU from the relay which are different from each other, thereby making it difficult the combination and decoding of the received data. That is, there is a problem in that it is difficult for the UE to perform data reception and decoding according to CoMP.

In order to solve the problem, there is possible a method of adding CoMP-dedicated new protocol/function to the protocol and function of a relay. However, this method is disadvantageous in that it increases complexity in implementations and also increases the implementation costs of not only a BS (i.e., a serving cell), but also a relay (i.e., a cooperative cell).

Figure 8:
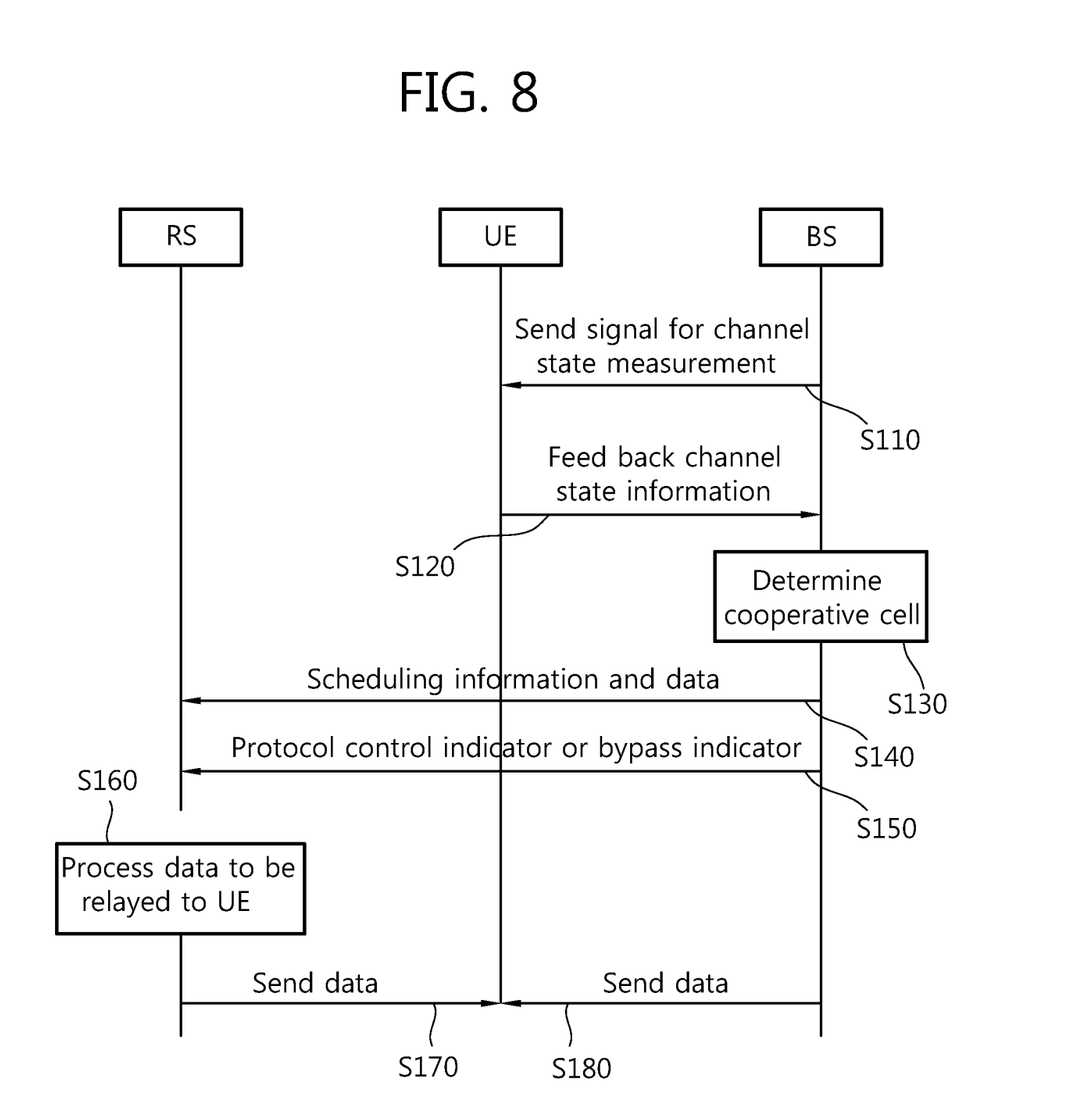
FIG. 8 is a flowchart showing a CoMP method according to an embodiment of the present invention.

FIG. 8 is a flowchart showing a CoMP method according to an embodiment of the present invention.

Referring to FIG. 8, a BS sends a signal for channel state measurement to a UE or an RS at step S110. The signal for channel state measurement may be transmitted in the form of a reference signal which can be known by the UE or the RS. The UE or the RS measures channel quality with the BS through the reference signal and feeds channel state information back to the BS at step S120. The BS selects a cooperative cell which can perform CoMP at step S130. Although not shown in the drawing, the BS may selectively request channel measurement information of an extended form and related information from the cooperative cell which can perform CoMP. The BS may determine a cell which will actually participate in CoMP based on the channel measurement information of an extended form and the related information. The channel measurement information of an extended form and the related information may be different pieces of information according to a CoMP method.

The BS classifies information into information that must be used by the BS, information that will be transmitted to the cooperative cell, and information that must be used by a higher layer based on the channel state information fed back from the UE or the RS. The BS sends scheduling information or data or both to the RS which is determined as the cooperative cell at step S140.

If the CoMP method is the JP method, the scheduling information and the data may be transmitted to the RS. If the CoMP method is the CS method, only the scheduling information may be transmitted to the RS. The scheduling information may include at least one of a PMI (precoding matrix indicator), a CQI (channel quality indicator), an RI (rank indicator), and CSI (channel status information) which are necessary for CoMP. The RS can know the time when data will be transmitted to the UE and an MCS (modulation coding scheme) according to the CoMP method based on the scheduling information.

The scheduling information generated by the MAC scheduler of the BS may be sent to the MAC scheduler of the RS through the control plane. The scheduling information may be used for processing in the PHY layer of PDSCH (physical downlink shared channel) data which is stored in the buffer of the RS.

The BS sends a protocol control indicator or a bypass indicator to the RS which is the cooperative cell at step S150. Here, the protocol control indicator may be information indicating whether a change of information about a specific protocol layer, transmitted by the BS, will be permitted in the decoding and encoding processes according to the protocol stack in the RS. For example, the protocol control indicator may be information about an MAC layer, transmitted by the BS, (i.e., information indicating whether a change of an MAC PDU will be permitted), and it may instruct that an MAC layer value received from the BS remains intact. The RS maintains the MAC PDU transmitted by the BS in the processing process for the RLC layer and the PDCP layer based on the value of the protocol control indicator. It is preferred that pieces of information about the size of an MAC PDU scheduled in the BS and an MCS, a PMI, etc. which are necessary when they are transmitted to the PHY layer be identically applied even when the RS sends the pieces of information to an Re UE. However, the MAC PDU transmitted by the BS may be changed in the RS in the processing processes of layers (i.e., an RLC layer and the PDCP layer) higher than the MAC layer. If the MAC PDU changed by the RS is sent to the UE, the changed MAC PDU is different from the MAC PDU transmitted from the BS to the UE. Accordingly, a problem arises because it is difficult for the UE to combine and decode the received MAC PDUs according to CoMP. The protocol control indicator prevents this problem.

The bypass indicator is information instructing that the RS process only some of its protocol layers. In other words, the bypass indicator may indicate a function (or protocol) that must be performed by the RS. The bypass indicator may be used to inform, for example, an RS type that must be performed by the RS. The bypass indicator may instruct the L3 relay to operate according to which type of a type 1, a type 2, and a type 3.

That is, in accordance with the CoMP method according to the embodiment of the present invention, 1) the protocol control indicator, instructing that information about a specific protocol layer (e.g., an MAC PDU and related information) transmitted by the BS be not reprocessed or changed, may be transmitted. In other words, the RS may function to only forward information and data, scheduled by the BS, to the UE without change based on the protocol control indicator. Alternatively, 2) the bypass indicator, instructing that the RS bypasses a specific protocol layer (e.g., a layer higher than the MAC layer), may be transmitted. In this case, a change of a protocol architecture that can be bypassed may be requested. Alternatively, an additional bypass protocol may be requested. The two types of the bypass indicators basically have their objects to prevent the RS from having an influence on the scheduling decision result of the BS. A basic assumption, however, is that an inevitable change may be made in the RS in order to achieve the objects and the information may also be known to the BS.

When the RS receives the protocol control indicator or the bypass indicator, the RS processes data to be relayed to the UE based on the protocol control indicator or the bypass indicator at step S160. A processing process of the RS according to the protocol control indicator or the bypass indicator is described in detail later.

The RS and the BS perform CoMP transmission to the UE at steps S170 and S180. The UE may receive signals from the BS and the RS according to CoMP and recover data from the signals.

Figure 9:
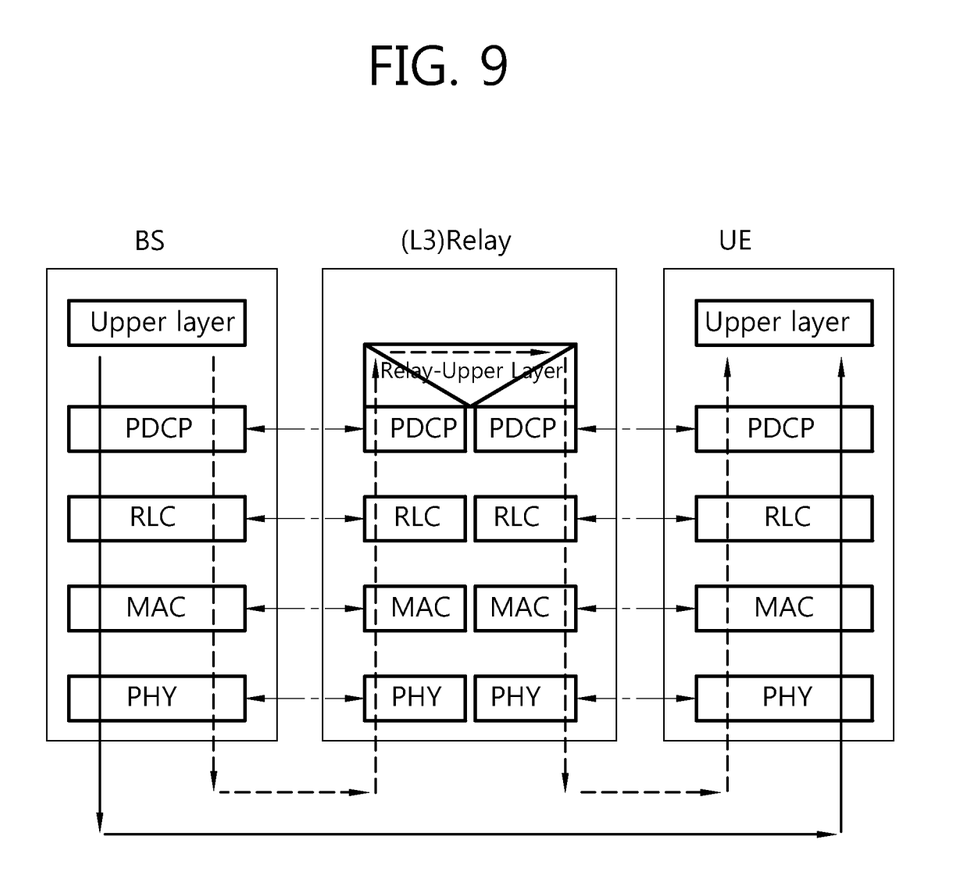
FIG. 9 shows the operation of a relay when a protocol control indicator is received.

FIG. 9 shows the operation of a relay when a protocol control indicator is received.

In FIG. 9, it is assumed that the relay is the L3 relay. A signal processed by a BS through a higher layer such as an IP layer, the PDCP layer, the RLC layer, the MAC layer, and the PHY layer is transmitted to the relay. The relay which has received the protocol control indicator performs processing according to relevant protocols in layers (i.e., the RLC layer and the PDCP layer) higher than the MAC layer, but performs the processing so that the size and contents of an MAC PDU transmitted by the BS are not changed. The protocol control indicator may be transmitted in the control plane. That is, the scheduler of the BS may configure the protocol control indicator in the form of RRC signaling and send the protocol control indicator to the relay. The protocol control indicator configured in the form of RRC signaling may deactivate or activate, for example, a segmentation function which is a specific function of the RLC layer. A UE may receive signals from the relay and the BS and perform decoding for the signals.

Figure 10:
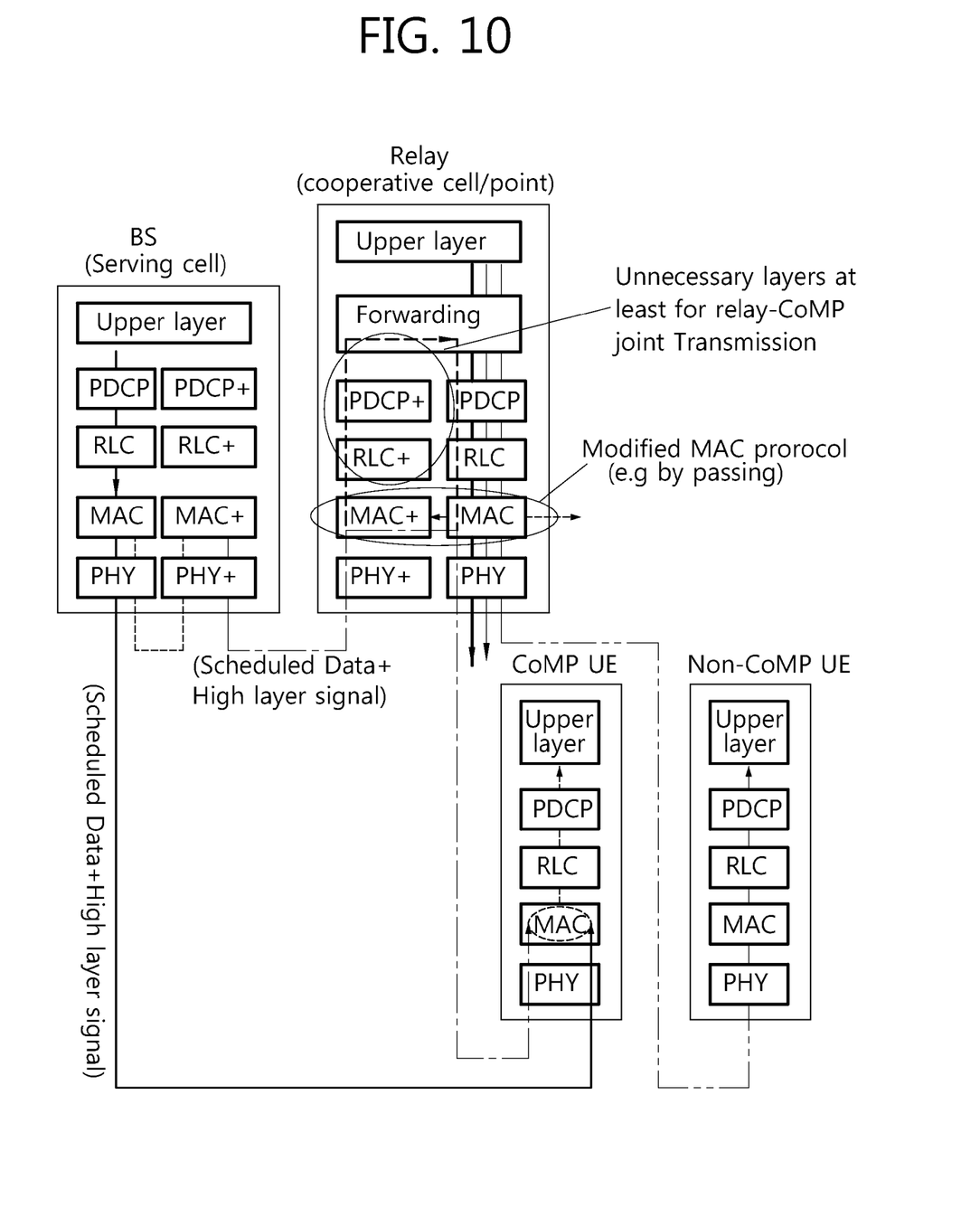
FIG. 10 shows the operation of a relay when a bypass indicator is received.

FIG. 10 shows the operation of a relay when a bypass indicator is received.

A BS (i.e., a serving cell) processes a signal according to relevant protocols in order of a higher layer such as an IP layer, the PDCP layer, the RLC layer, the MAC layer, and the PHY layer and sends the processed signal to a UE which receives the signal according to CoMP (hereinafter referred to as a CoMP UE). Meanwhile, the BS may process a signal according to relevant protocols in regard to the MAC layer and the PHY layer and send the processed signal to the relay.

The relay (i.e., a cooperative cell) which has received the bypass indicator may activate and perform only necessary functions according to a relay type or function indicated by the bypass indicator. For example, the L3 relay may perform only the functions of the L2 relay. In this case, the L3 relay may perform decoding and encoding processes according to the protocols of the PHY layer and the MAC layer and bypasses higher layers, such as the RLC layer and the PDCP layer. A protocol when only processing for some of the protocol layers is performed as described above may be called the bypass protocol. In FIG. 10, the bypass protocol is indicated by MAC+ and PHY+. The bypass protocol may be previously defined according to the type of a relay in which the L3 relay can be operated (e.g., according to whether the L3 relay is operated according to which one of the L1 and L2 relays). If the bypass indicator is used as described above, resources consumed for processing in higher layers can be reduced. FIG. 10 shows only a case where the L3 relay performs processing for only the PHY layer and the MAC layer, but not limited thereto.

Figure 11:
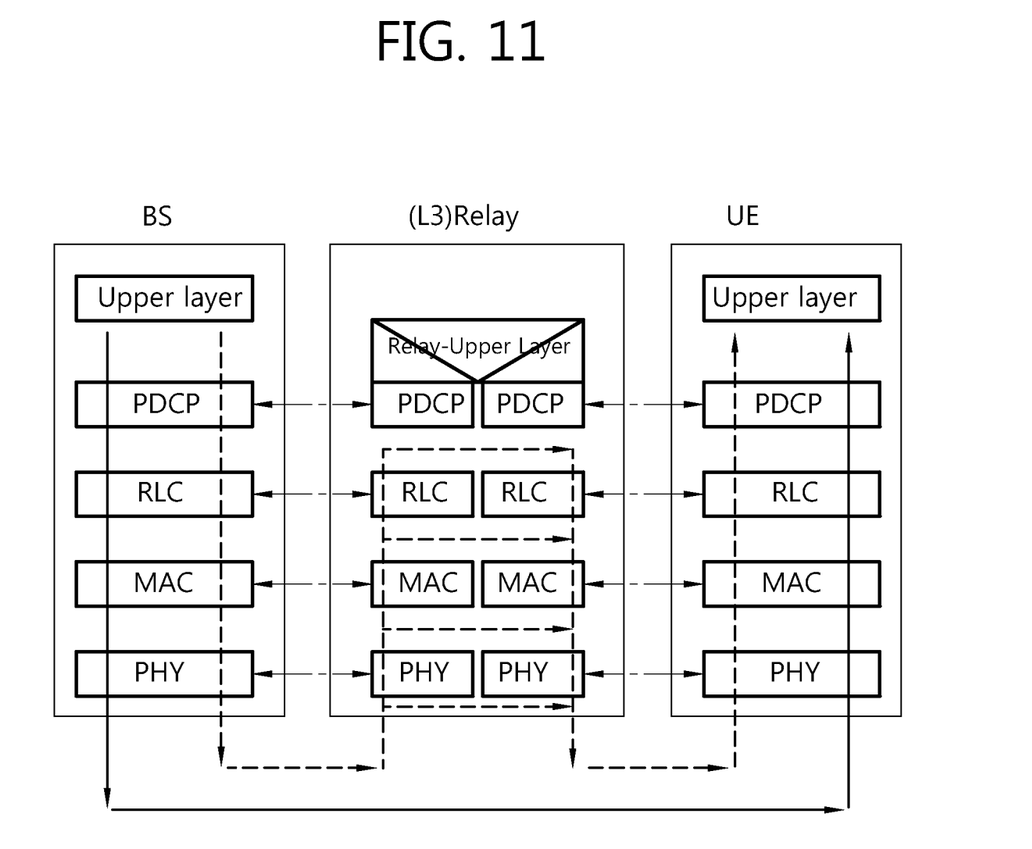
FIG. 11 shows another example of the operation of a relay when a bypass indicator is received.

FIG. 11 shows another example of the operation of a relay when a bypass indicator is received. The relay may perform processing up to the RLC layer or process only the PHY layer according to the bypass indicator as shown in FIG. 11.

The bypass indicator may be transmitted along with pieces of information, such as a PMI, a CQI, an RI, and CSI which are directly necessary for CoMP.

The pieces of scheduling information, such as the PMI, the CQI, the RI, and the CSI, are used as PHY layer transport information, but may also be used in higher layer scheduling. Accordingly, the pieces of scheduling information may be designed in the form of a single signal and transmitted so that they can be shared by several layer. However, an additional signal may be necessary so that different layers can share the pieces of scheduling information within the relay.

Alternatively, an additional signal may be configured and operated according to each layer of the relay. For example, scheduling information necessary for MAC layer scheduling may be transmitted through an MAC layer signal, and signaling information necessary for the PHY layer may be transmitted through the PHY layer. If signaling information is transmitted through the PHY layer, a control channel or a data channel may be used.

A CoMP UE which receives a signal according to the CoMP method can receive signals from a BS (i.e., a serving cell) and a relay (i.e., a cooperative cell) and combine and decode the signals in the MAC layer.

Figure 12:
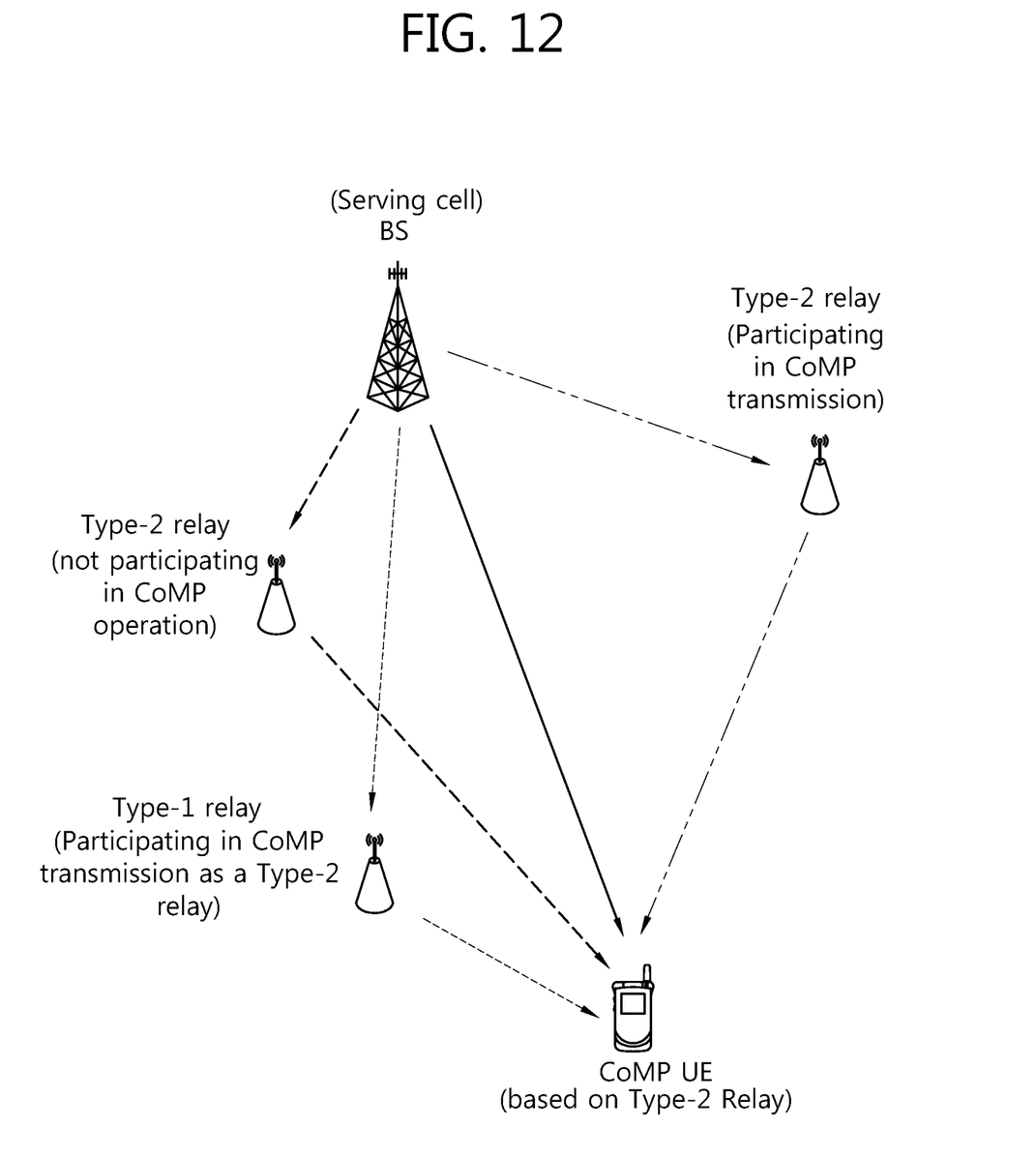
FIG. 12 shows a method of performing CoMP in a wireless communication system including heterogeneous relay stations.

FIG. 12 shows a method of performing CoMP in a wireless communication system including heterogeneous relay stations.

Referring to FIG. 12, the wireless communication system may include different and heterogeneous relays, such as the L2 relay and the L3 relay. A less number of the L3 relays than the L2 relays may be deployed because of causes, such as an expense. Alternatively, the L3 relay may be placed close to a UE.

A UE may receive signals from a BS, the L2 relay, and the L3 relay according to CoMP. In this case, the BS may send the bypass indicator to the L3 relay so that the L3 relay is operated as the L2 relay. That is, the BS may instruct a relay to operate as a relay of a specific type through the bypass indicator. The bypass indicator functions to switch a relay to a preferred relay type so that the relay is operated as the preferred relay type. In response thereto, the L3 relay generates a signal according to the protocol of the L2 relay and relays the generated signal. Accordingly, the L3 relay can send a signal having the same protocol as another L2 relay.

That is, the BS can activate or deactivate a variety of previously defined relay operation modes through the bypass indicator. For example, the bypass indicator can be used to deactivate some of the functions of the L3 relay. Even when a UE can perform only CoMP based on the L2 relay, CoMP is possible according to the present invention.

All the functions described above may be executed by a microprocessor, a controller, a microcontroller, or a processor such as an ASIC (Application Specific Integrated Circuit) according to software or program codes coded to execute the functions. The design, development and/or implementation of the codes may be said to be evident to those skilled in the art based on the description of the present invention.

All the functions described above may be executed by a microprocessor, a controller, a microcontroller, or a processor such as an ASIC (Application Specific Integrated Circuit) according to software or program codes coded to execute the functions. The design, development and/or implementation of the codes may be said to be evident to those skilled in the art based on the description of the present invention.

The invention claimed is:

1. A method of a first relay performing Cooperative Multiple Points Transmission and Receptions (CoMP), the method comprising:
    receiving, by the first relay, scheduling information and first data from a base station;
    receiving, by the first relay, a bypass indicator from the base station;
    performing, by the first relay, protocol layer processing for the scheduling information and the first data; and
    transmitting, by the first relay, the processed first data to a user equipment (UE) based on the processed scheduling information,
    wherein the bypass indicator is information instructing that the protocol layer processing be performed for only some protocol layers included in the first relay, and
    wherein, if the first relay is scheduled to transmit the processed first data simultaneously with second data transmitted by a second relay to the UE and if the first relay has more protocol layers than those of the second relay, the bypass indicator instructs the first relay to perform protocol layer processing for only protocol layers corresponding to protocol layers processed by the second relay.

2. The method of claim 1, wherein if protocol layers included in the first relay include a physical layer, an MAC (medium access control) layer, an RLC (radio link control) layer, and a PDCP (packet data convergence protocol) layer, the bypass indicator is information instructing that the processing be performed in regard to only the physical layer and the MAC layer.

3. The method of claim 1, further comprising:
    receiving third data from a base station;
    receiving a protocol control indicator from the base station;
    performing protocol layer processing for the third data according to the protocol control indicator; and
    transmitting the processed third data to the UE,
    wherein the protocol control indicator is information instructing that an MAC layer value received from the base station remains intact in the protocol layer processing for the third data.

4. The method of claim 3, wherein the protocol control indicator is transmitted in a form of a radio resource control (RRC) signal.

5. The method of claim 3, wherein the protocol control indicator is information instructing that a size and value of an MAC protocol data unit (PDU) received from the base station remain intact.

6. A relay configured for Cooperative Multiple Points Transmission and Receptions (CoMP) and comprising:
    a radio frequency (RF) unit; and
    a processor operatively connected to the RF unit and configured to:
        receive scheduling information and first data from a base station;
        receive a bypass indicator from the base station;
        perform protocol layer processing for the scheduling information and the first data; and
        transmit the processed first data to a user equipment (UE) based on the processed scheduling information,
        wherein the bypass indicator is information instructing that the protocol layer processing be performed for only some protocol layers included in the relay, and
        wherein, if the relay is scheduled to transmit the processed first data simultaneously with second data transmitted by a second relay to the UE and if the relay has more protocol layers than those of the second relay, the bypass indicator instructs the relay to perform protocol layer processing for only protocol layers corresponding to protocol layers processed by the second relay.

* * * * *